United States Patent [19]

Mostashari

[11] Patent Number: 5,199,619
[45] Date of Patent: Apr. 6, 1993

[54] MULTI FUNCTIONAL CARRIER PACK FOR ATTACHMENT TO FRONT HANDLEBAR OF BICYCLE (BIKE PAL)

[76] Inventor: Seyed M. Mostashari, 3901 Tunlaw Rd., N.W. #103, Washington, D.C. 20007

[21] Appl. No.: 591,403
[22] Filed: Oct. 2, 1990
[51] Int. Cl.$^5$ ............... B62J 7/06; B62J 9/00
[52] U.S. Cl. .................... 224/36; 224/32 R
[58] Field of Search ............ 224/32 R, 36, 41, 30 A

[56] References Cited

U.S. PATENT DOCUMENTS

| | | | |
|---|---|---|---|
| 2,401,245 | 5/1946 | Hobbs | 224/36 |
| 4,056,219 | 11/1977 | Hine, Jr. | 224/36 |
| 4,260,086 | 4/1981 | Hine, Jr. et al. | 224/41 |
| 4,440,332 | 4/1984 | Kullen | 224/36 |
| 4,542,839 | 9/1985 | Levine et al. | 224/41 |
| 4,921,151 | 5/1990 | Duvall | 224/32 R |

FOREIGN PATENT DOCUMENTS

| | | | |
|---|---|---|---|
| 2497487 | 7/1982 | France | 224/30 A |
| 225284 | 1/1943 | Switzerland | 224/36 |
| 22421 | of 1895 | United Kingdom | 224/32 R |

*Primary Examiner*—Linda J. Sholl

[57] ABSTRACT

This invention relates to a detachable multi functional bicycle pack (Bike Pal) mounted detachably to front handle bar of a bicycle. The bicycle pack provides:

A. Resists rocking and swinging motions independent form the bicycle;
B. Can be easily detached from the bicycle and be carried by the bicycle rider;
C. Retains its geometrical shape regardless of items stored in it;
D. Has an aerodynamic shape facilitating the movement of bicycle though the air;
E. Provides dedicated compartments for various electronic devices, photography equipments and personal items often used by a bicycle rider, such compartments providing adequate protection for those equipments and devices;
F. Provides a map holder with direction indicator enabling the rider to read maps and find directions without the need to dismount from bicycle;
G. Provides an insulated space for a water container preventing the water from getting hot due direct sun rays;
H. Provides a demountable rechargeable front headlight for evening trips.

10 Claims, 11 Drawing Sheets

MULTI FUNCTIONAL CARRIER PACK FOR ATTACHMENT TO FRONT HANDLEBAR OF BICYCLE (BIKE PAL)

There has been numerous designs for bicycle packs using various materials and shapes since the invention of bicycle itself. However, there has not been a detachable carrier pack that provides dedicated compartments for various electronic devices and photography equipment as well as specially designed rechargeable and detachable front head-light, map holder, space for carrying books and personal items, insulated water container, various detachable interior dividers, shoulder straps to carry the pack while also having an aerodynamic shape which facilitates the movement of the bicycle with less energy. This multi functional carrier pack, hereafter referred as Bike Pal, provides the necessary space for carrying personal items equipment and instrument that a bicycle rider may wish to carry.

BACKGROUND OF INVENTION

This invention relates to a detachable multi functional bicycle pack (Bike Pal) detachably mounted to the front handle bar of a bicycle. Bicycle packs traditionally contain a multi-purpose compartment which is used for storing various items with no regard for protection of various electronic items used extensively by bicycle riders. These packs may feature various side or front pockets to store printed matters. These packs are often made out of canvas materials and their shape may change according to the items they store. Furthermore, because these carrier packs are made of flexible material, they usually do not keep their geometrical shape and they are not stable when the bicycle is in motion. These packs may block the front head light of the bicycle if such head light are mounted on the handle bar stem. Using stored items such as maps requires dismounting from bicycle. None of the bicycle packs provide an insulated space for a water container to keep water from getting hot because of direct sun rays to water container in its usual location on the frame of the bicycle.

SUMMARY OF INVENTION

It is therefore an object of this invention to provide an improved, lightweight bicycle pack which;
A. Resists rocking and swinging motions independent from the motion of the bicycle;
B. Can be easily detached from the bicycle and be carried by the bicycle rider;
C. Retains its geometrical shape regardless of items stored in it;
D. Has an aerodynamic shape facilitating the movement of the bicycle though the air;
E. Provides dedicated compartments for various electronic devices, photography equipment and personal items often used by a bicycle rider, such compartments providing means to adequately protect those equipment and devices;
F. Provides a map holder with direction indicator enabling the rider to read maps and find directions without the need to dismount from bicycle;
G. Provides an insulated space for a water container preventing the water from getting hot due direct sun rays;
H. Provides a demountable rechargeable front head-light for evening trips.

This invention features a reinforced bicycle pack including a bag having a back, a front, two sides, a bottom and couple of top doors. The body of subject invention is composed of two different materials; The front, top, sides and portions of bottom and back sides are made out of a light weight, durable, semi-rigid, synthetic materials providing the interior compartments of the pack with protection and adequate rigidity to keep the shape of the pack while it is loaded without any noticeable deformation. The remaining portions may be constructed of a canvas type or any light weight synthetic material. This pack may be mounted to the front handle bar of a bicycle by using its side straps and a specially designed hook and slot where the hook is mounted on the stem of front handle bar and the slot is mounted on the back side of the bicycle pack.

Inside Bike-Pal, there are various protected compartments used for storing photography equipment such as camera, lenses, filters, film cans as well as detachable partitions dividing the remaining space into smaller sections to be used for carrying printed matters and /or personal items according to individual needs of each bicycle rider. Furthermore, There is an insulated compartment for an specially designed water container inside the main compartment of Bike Pal.

The front panel of Bike Pal is comprised of two parts. The bottom part is the body of the front panel which has a reflector in its center. The top part is large door giving access to multi-purpose compartment of the bicycle. Both parts form an aerodynamically shaped surface facilitating movement of the bicycle through the air. There is rechargeable demountable front head-light mounted over the front panel top door. Top panel is composed of two multi-purpose doors and a connecting rigid strip. The larger door provides a special hook in its exterior side where various types of portable radios, cassette players, compact disk players, or portable televisions can be mounted to the said hook. This door provides access to photography equipments compartment. There is a smaller door next to the large door having a transparent window designed in a special configuration used in conjunction with reading maps. The front part of this window shaped as a North arrow. There is a direction indicator in the middle of this window. In the interior side of this door, there is a plastic layer attached to three sides of the door forming a pocket between the door and the plastic layer. To use the map, the desired portion of map is folded and placed face up in this pocket. Bicycle rider can read the map though the window without dismounting from bicycle. This map compartment provides continuous access to desired portion of the map while being water proof and easily accessible. By adjusting the location of the map inside the pocket, the rider can place the map according to its North direction, destination mark or his present location. This door facilitates access to insulated water container located directly underneath it. These doors are hinged to a continuous rigid strip connecting the two side panels together. These doors are angled in such a way to facilitate reading of the map and gadgets in electronic equipments mounted on top of the large door.

Over the rigid connecting strip there is a digital clock, a speedometer, Calory counter and or any other electronic instrument the rider wishes to carry. For this reason the entire unused portion of this strip is covered with VELCRO strip providing suitable place for attaching various items.

Side panels feature two sets of straps, a wide adjustable strap mounted approximately in the middle of the side panel used for carrying the pack on the shoulder, and second set of strap used to stabilize the pack on the bicycle.

The back and bottom panel join each other through a smooth curve. At the center of these panel where they join each other, there is a specially designed slot. To mount the pack on the bicycle, this slot is slide through a specially designed metal hook mounted on the stem of the bicycle creating a firm grip for the pack.

Further objects and advantages of my invention will become apparent form consideration of the drawings and following description.

DETAILED DESCRIPTION OF THE PREFERRED EMBODIMENT

The subject invention is a detachable multi functional bicycle pack hereafter called Bike Pal detachably mounted to front handle bar of a bicycle. Such a pack provides dedicated compartments for various electronic devices and photography equipment for adequate protection as well as a specially designed rechargeable and detachable front head-light, map holder with direction indicator, space for carrying books and personal items, insulated water container, various detachable interior dividers, shoulder straps to carry the pack and while having an aerodynamic outer shell which such shape facilitates the movement of the bicycle with less energy. The drawings illustrate the preferred embodiment of a typical Bike Pal.

Figure 3:
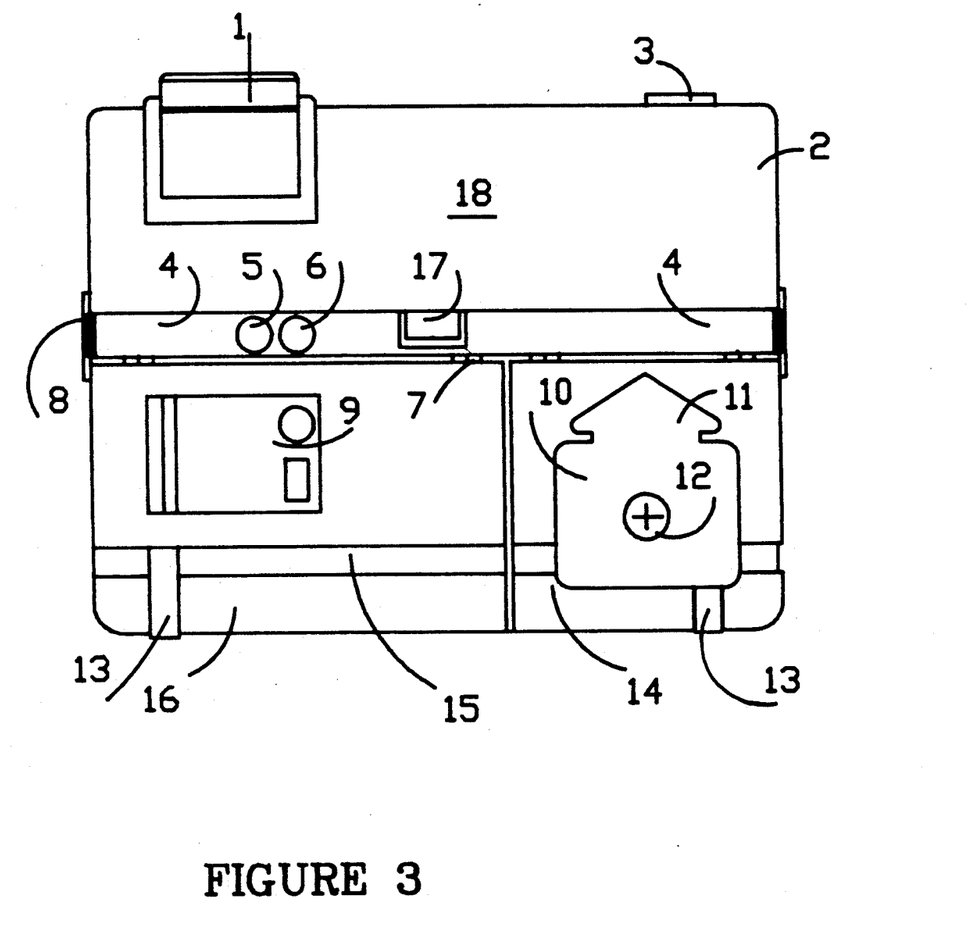
FIG. 3: Top view of Bike Pal showing top doors and front light as well as other equipments mounted on the front panel.
Figure 5:
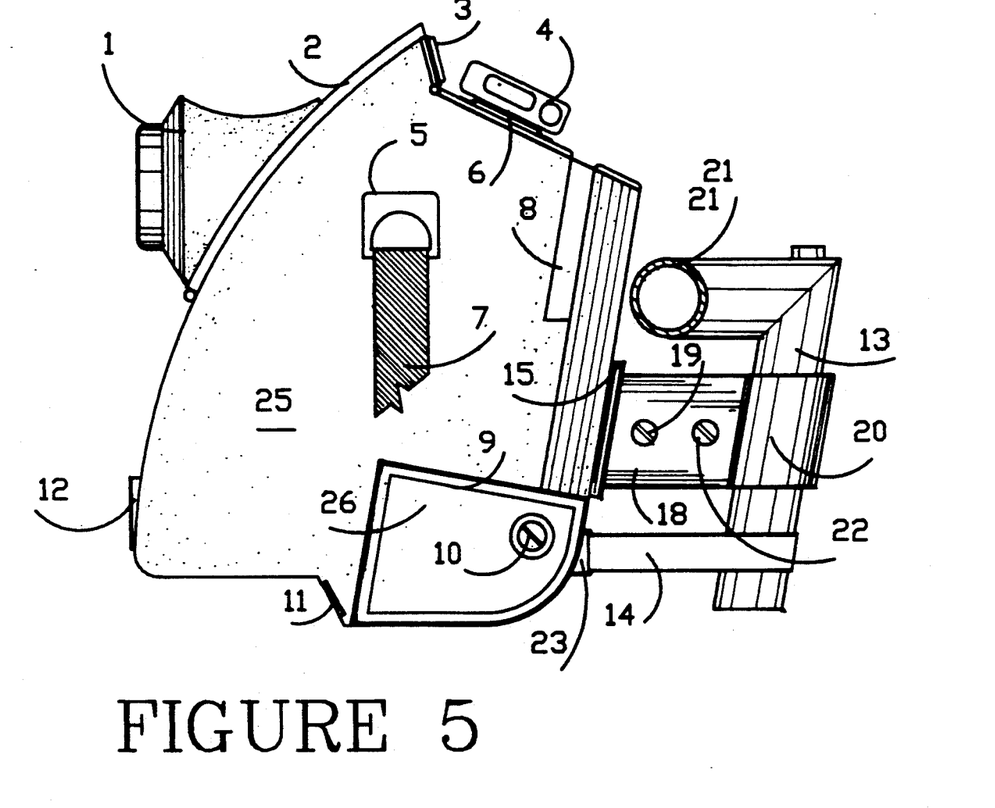
FIG. 5: Side view of Bike Pal near front light showing front light, tool storage door, carrying straps, holding hooks, radio, and other electronic devices.
Figure 6:
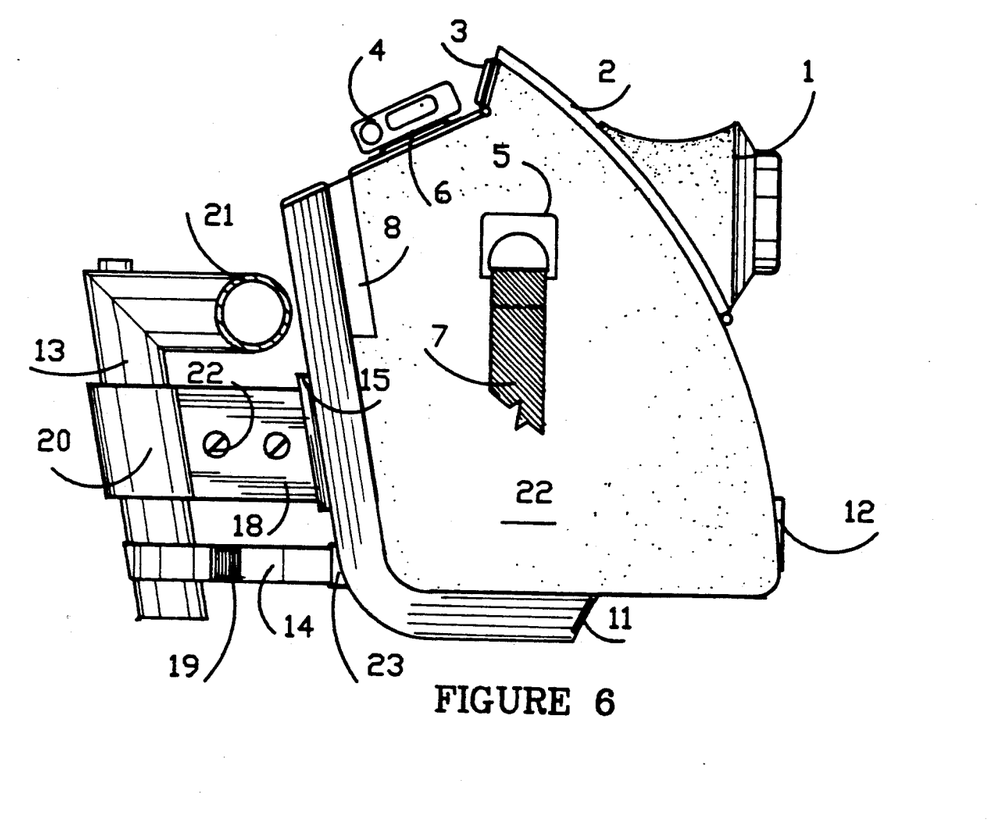
FIG. 6: Side view of Bike Pal showing carrying straps, holding hooks and front lights.
Figure 7:
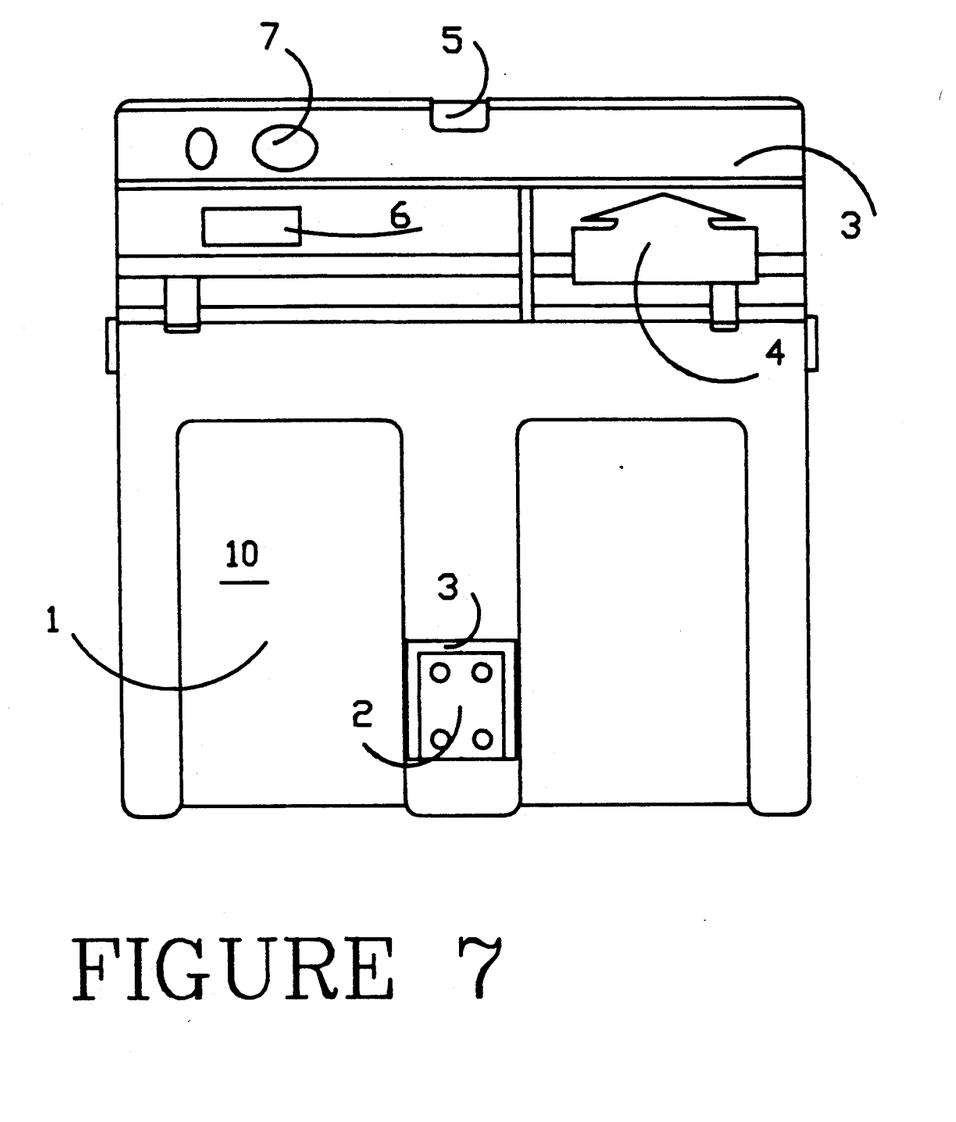
FIG. 7: Rear view of Bike Pal.
Figure 8:
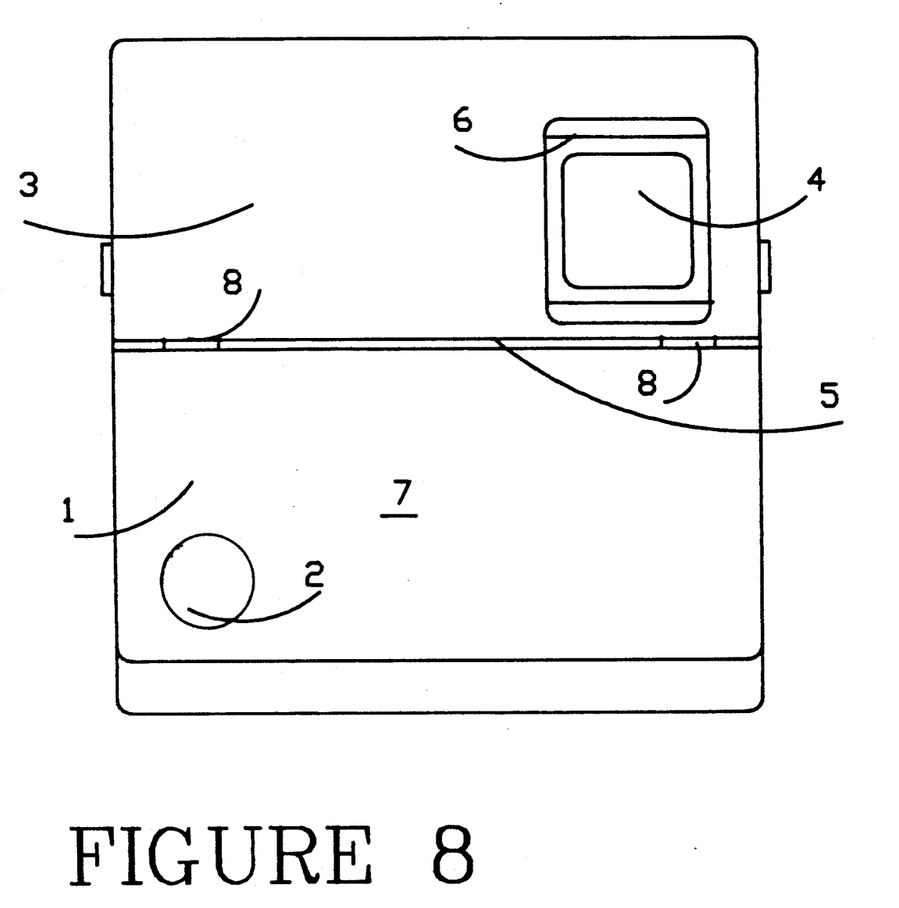
FIG. 8: Front view of Bike Pal.
Figure 9:
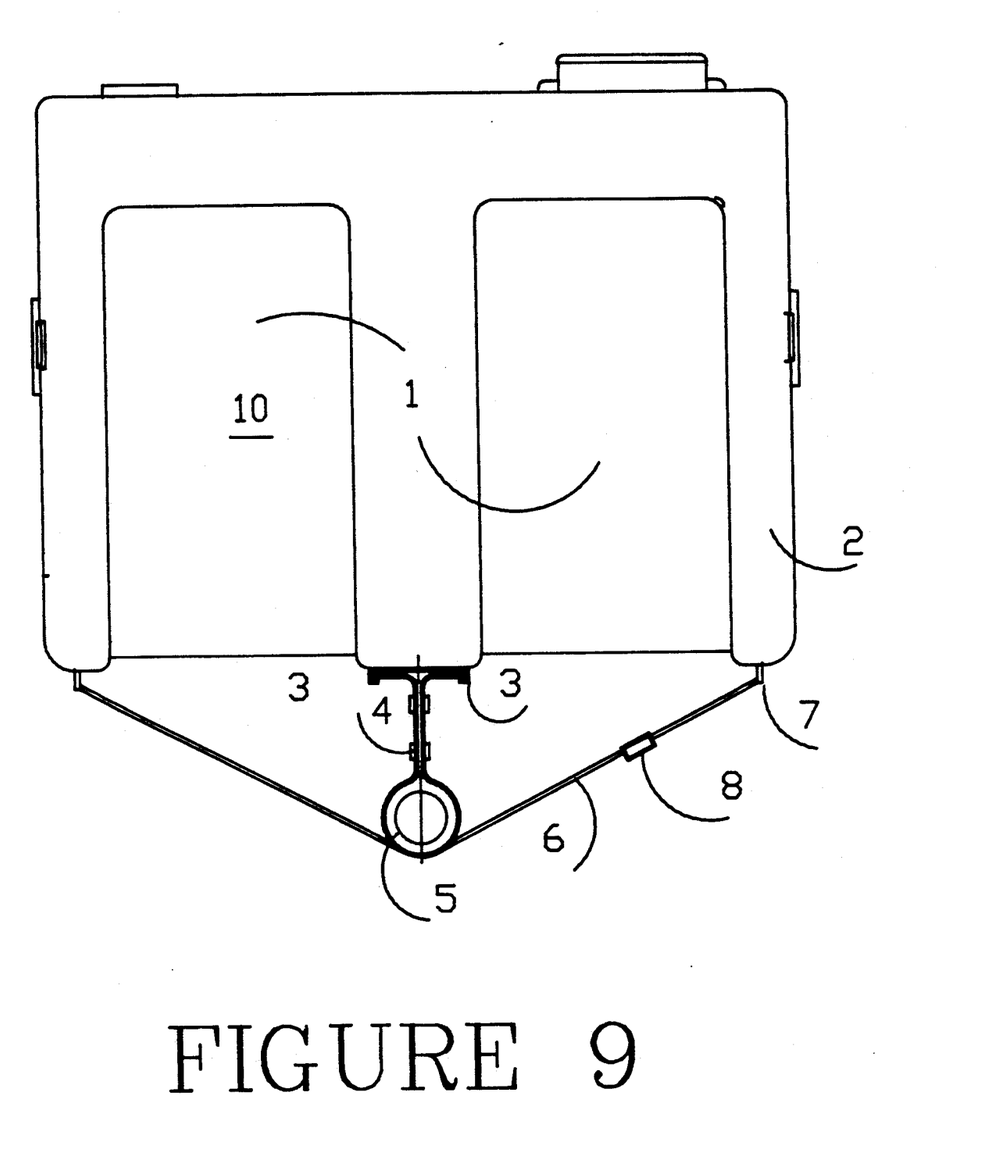
FIG. 9: View of bottom panel when Bike Pal is installed.
Figure 10:
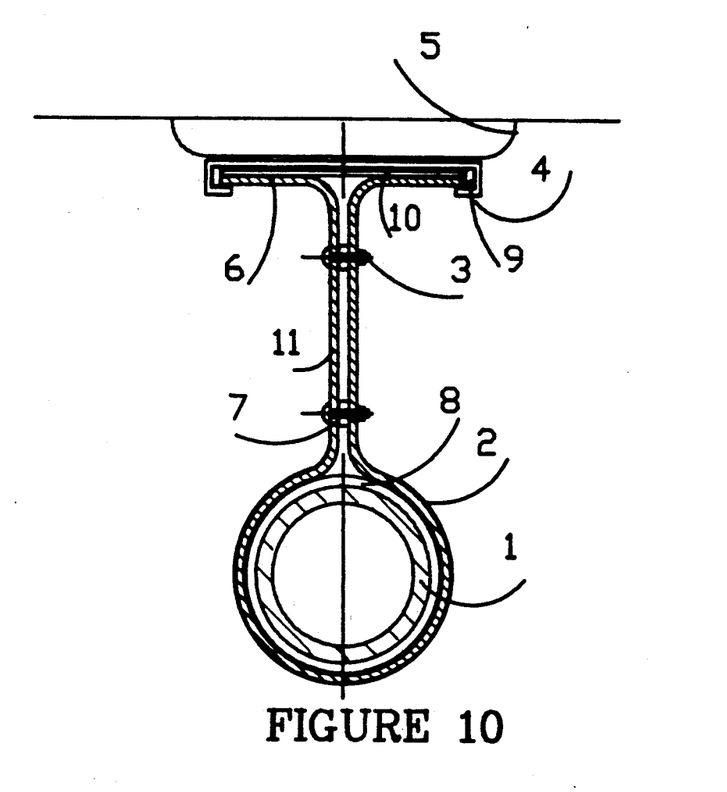
FIG. 10: Enlarged drawing of fastening mechanism.

This invention features a reinforced bicycle pack including a pack having a rear panel (FIG. 7, No. 10), a front panel (FIG. 8, No. 7),two side panels (FIG. 6, No. 22 and FIG. 5, No.,25), a bottom panel (FIG. 9, No. 10) and a top panel comprising of couple of top doors providing access to interior compartments (FIG. 3, No. 18). The body of subject invention may be composed of two different materials; The front panel (FIG. 8, No. 7), top panel (FIG. 3, No. 18), side 1 panel (FIG. 5, No. 25), side 2 (FIG. 6, No. 22) and portions of bottom panel (FIG. 9 No. 10) and portion rear panel (FIG. 7, No. 10) may be made of a light weight, durable, semi rigid, synthetic material providing the interior compartments of the pack with protection and adequate rigidity to keep the shape of the pack while it is loaded without any noticeable deformation. The remaining portions of rear panel (FIG. 7, No. 1) and bottom panel (FIG. 9, No. 1) may be made out of canvas type materials. There is a central mounting hook (FIG. 10) comprising of various parts mounted on the rear panel of Bike Pal and front handle bar stem of the bicycle. Bike Pal may be mounted to the front handle bar stem of a bicycle (FIG. 5 and 6 No. 13) by sliding a specially designed metal grip (FIG. 7 No. 2, FIG. 5 and 6, No. 15) mounted in the center of rear panel of Bike Pal through a metal hook (FIG. 5 and 6, No. 18) mounted on the stem of front handle bar of bicycle. FIG. 10 shows detailed construction of said hook. Said hook comprising of (FIG. 10, No. 2) a shape made of a light weight metal of approximately one inch wide, formed in such way that creates three distinct sections. First section is a circular portion wrapping around the bicycle handle bar stem (FIG. 10, No. 2 and FIG. 5, No. 20), There is a rubber type material covered interior surface of said portion to develop enough friction between stem and the interior surface of the hook while protecting the paint over the stem from damaging by possible movement of the hook (FIG. 10, No. 8). Second section is straight section (FIG. 5, No. 18 and FIG. 10, No. 11) extended far enough to pass the front handle bar (FIG. 5, No. 21). This section has two holes (FIG. 5, No. 19 and FIG. 10, No. 7) for couple of tightening screws and bolts (FIG. 5, No. 22 and FIG. 10, No. 3) to secure the hook to the front handle bar of the bicycle. Third section is the far end of hook turned perpendicular to its second section (FIG. 10, No. 6) creating two edges for the metal grip mounted to the rear panel of the Bike Pal to slide through (FIG. 10, No. 4) There is reflector mounted over the front face of this section (FIG. 10, No. 10). This reflector is a constitutes bicycle's front reflector when Bike Pal is not used. There is rubber strip (FIG. 10, No. 9) mounted on the vertical edges of end section and said reflector. Said rubber strip keeps said grip mounted on the rear side of the pack away from reflector thus protecting the surface of reflector as well as reducing the noise of having metal part hitting each other during a ride. The top portion of the metal grip is covered with a panel (FIG. 7, No. 3) preventing Bike Pal from falling through the hook. Additionally, there is an adjustable strap (FIG. 9, No. 6) mounted to the bottom portion of side panels of Bike Pal (FIG. 5 and 6 No. 14) wrapped around the bicycle front handle bar stem (FIG. 9, No. 5) and tightened with a buckle (FIG. 9, No. 8 and FIG. 6, No. 19). This strap prevents Bike Pal from lateral motions independent from bicycle while central mounting hook keeps Bike Pal firm in place.

Figure 1:
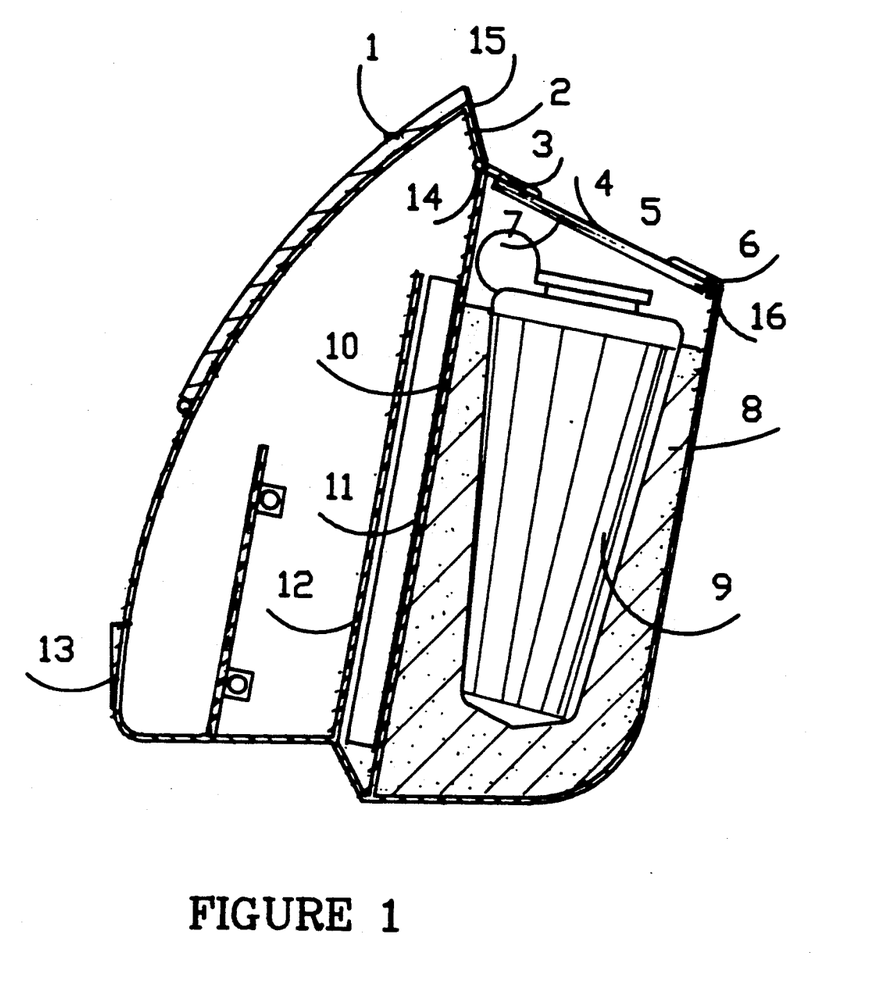
FIG. 1: Vertical section through Bike Pal showing insulated water container and multi purpose compartment.

Interior space of Bike Pal is divided into various dedicated compartments. Starting from interior corner created by rear panel (FIG. 4, No. 16) and side panel (FIG. 4, No. 15), there is an light weight plastic liquid container (FIG. 4, No. 4) surrounded by rigid insulation material (FIG. 4, No. 5) preventing outside heat from reaching the liquid container. The liquid container is shaped in a conical fashion (FIG. 1, No. 9) to facilitate removing it while riding on the bicycle. Rigid insulation extends to top neck of liquid container (FIG. 1, No. 8) creating maximum closure for water container.

Figure 4:
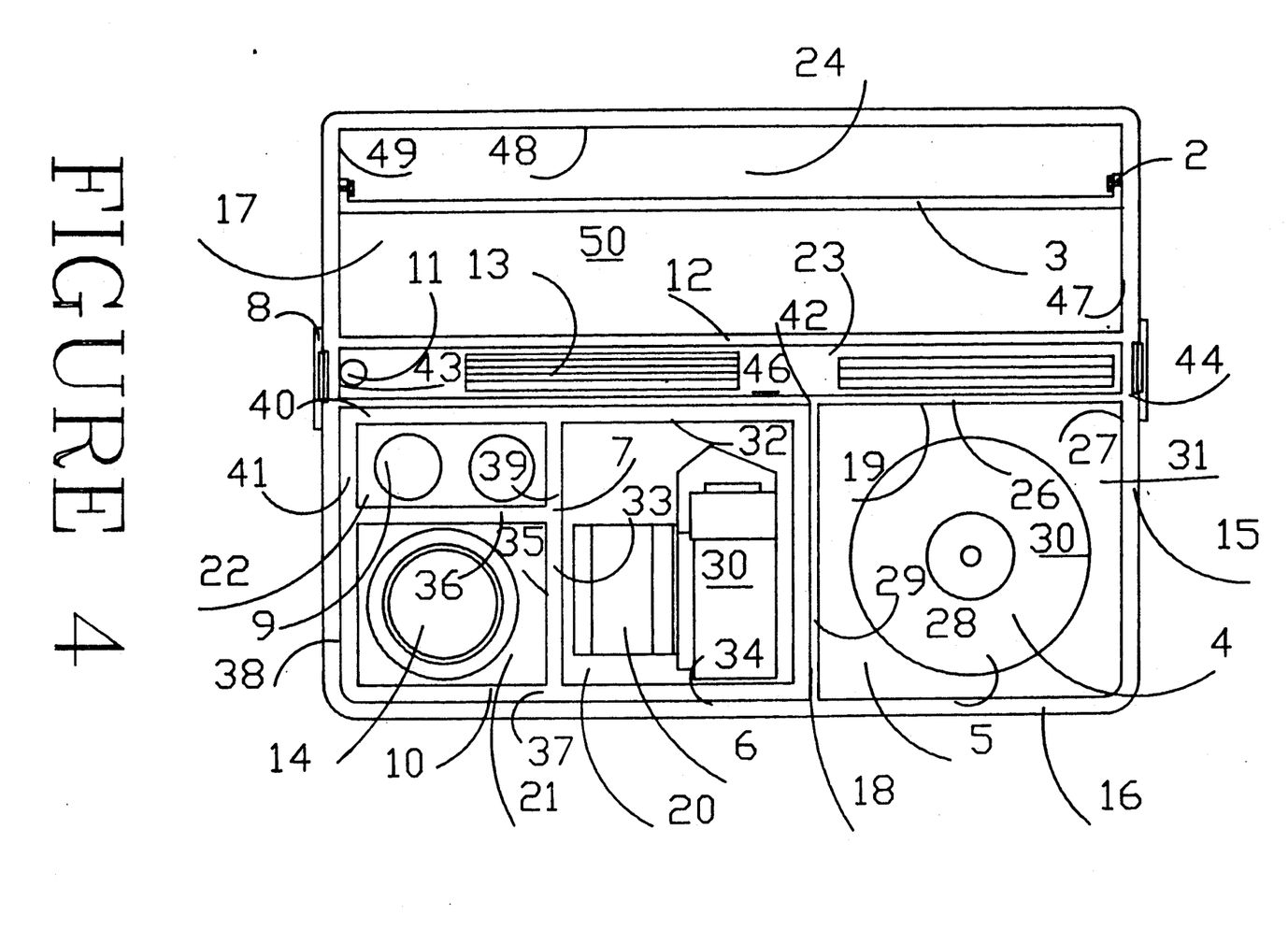
FIG. 4: Horizontal section through Bike Pal showing insulated water container, camera compartment, lens compartment, film compartment, book compartment ad multipurpose compartment.

Liquid container compartment (FIG. 4, No. 31) created by four interior side panels (FIG. 4, No. 26, 27, 28, 29) and a bottom panel (FIG. 4, No. 30) These panels are made of water proof synthetic material and they are attached to interior face of exterior side panels as well as the rear panel of Bike Pal (FIG. 4, No. 18 and No. 19).

Figure 2:
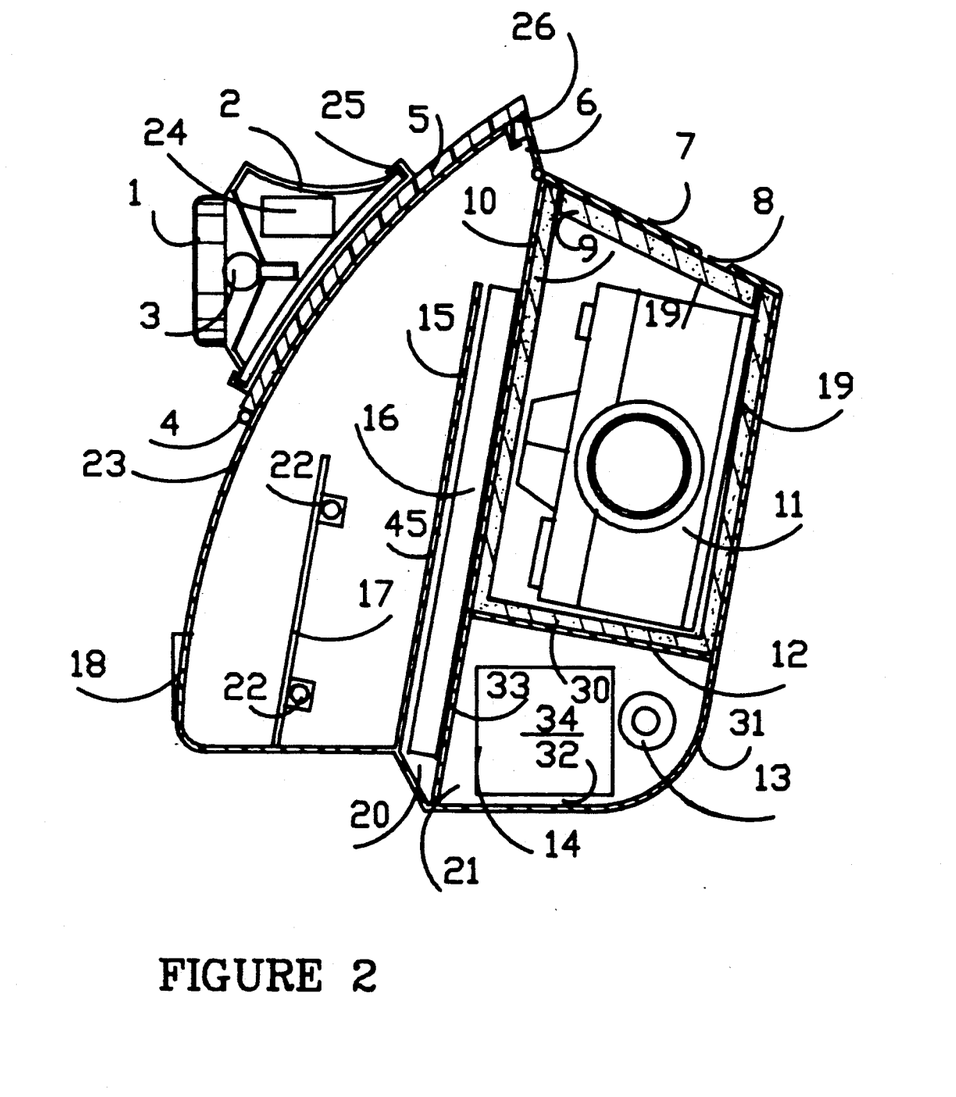
FIG. 2: Vertical section through Bike Pal showing camera compartment, multi-purpose compartment book compartment and tool compartment.

Next to the liquid container compartment there is specially designed compartment defined by four side panels (FIG. 4, No. 32, 33, 34 and 29) and the bottom panel (FIG. 4, No. 30) for carrying a camera (FIG. 4, No. 20). Next to this compartment there is another compartment (FIG. 4, No. 21) dedicated for carrying camera lenses defined by four side panels (FIG. 4, No. 35, 36, 37, and 38) as well as bottom panel 30. Next to lens compartment there is film compartment (FIG. 4 No. 22) defined by four side walls (FIG. 4, No. 36, 39, 40 and 41) as well as bottom panel (FIG. 4, No. 30) to carry film rolls and other accessories. Entire interior surfaces of camera compartment, lens compartment and film compartment including its top and bottom surfaces are covered by a padding material such as any foam type material (FIG. 4, No. 10 and FIG. 2, No. 9) which in turn is covered with soft fabric (FIG. 2, No. 19). Such padding provides protection for sensitive camera equipment during rough rides. Furthermore, by locating the camera compartment (FIG. 4, No. 20) next to rear panel of Bike Pal in a centrally located area, the camera (FIG. 4, No. 6) is further protected from damages caused by possible front or side collision of the bicycle.

A typical camera (FIG. 4, No. 6), a typical lens (FIG. 4, No. 14) and typical film rolls (FIG. 4, No. 9) are shown in their proper positions in their respective compartments.

There is a long and narrow compartment (FIG. 4, No. 23) hereafter called book compartment defined by four interior walls (FIG. 4, No. 42, 43, 44, 45) as well as bottom panel (FIG. 4 No. 46) and (FIG. 2, No. 20) located next to camera equipment and liquid container compartment. This compartment is separated by plastic panels attached to side panels (FIG. 4, No. 15 and No. 8) and bottom panel of Bike Pal. This compartment is suitable for storing printed matters such as magazines, books, note books etc. There is pen holder (FIG. 4, No. 11) mounted to the interior side of side panel number 2.

Underneath and extending the entire length of camera compartment, There is another compartment defined by four walls (FIG. 2, No. 30, 31, 32, 33,) as well as rear vertical panel of (FIG. 2, No. 34) and front access door (FIG. 5, No. 26) this compartment is used for storing tools and miscellaneous items. The front access door (FIG. 5, NO. 26) is equipped with a lock (FIG. 5, no. 10) providing this compartment more security. This compartment is used for storing spare bicycle tube, flat tire patching tools and other miscellaneous items such as valet, keys and other small items.

Next to book compartment, there is a multi-purpose compartment (FIG. 4, No. 24) Defined by four interior walls (FIG. 4, No. 45, 47, 48, 49) and bottom panel (FIG. 4, No. 50) with a detachable interior divider (FIG. 4, No. 3) and FIG. 2, No. 17). This compartment can be used for storing any item bicycle rider wishes to carry. The divider can be attached to side panels of Bike Pal by using bottoms located in either side of the divider (FIG. 4, No. 2 and FIG. 2, No. 22).

The front panel of Bike Pal comprising of a curved surface (FIG. 8) is comprised of two sections. The bottom section (FIG. 8, No. 1 and FIG. 2, No. 23) is the body of the front panel extended to sides and bottom panels. This panel along side panels, bottom panel rear panel and all the interior dividers can be made monolithically out of a light weight synthetic material creating a shell type structure. On the lower left hand corner of the bottom section of front panel, there is a reflector mounted (FIG. 8, No. 2 and FIG. 2, No. 18) this reflector replaces the front reflector of bicycle usually mounted on handle bar stem of the bicycle. The top Section of the front panel (FIG. 8, No. 3 and FIG. 2, No. 5) is a curved shaped door (FIG. 2, No. 5 and FIG. 8, No. 3) hinged to the top edge of bottom section (FIG. 2, No. 4) providing access to multi-purpose and book compartment of Bike Pal. Both top and bottom section of front panel are curved to an aerodynamical shape with smooth surface facilitating movement of the bicycle through the air. There is rechargeable demountable front head-light (FIG. 5, No. 1 and FIG. 8, No. 4) mounted over the front panel front door (FIG. 5, No. 2). This specially designed headlight (FIG. 5, No. 1) comprising of a light bulb (FIG. 2, No. 3), a plastic body (FIG. 2, No. 2), a rechargeable battery(FIG. 2, No. 24) and a front lens FIG. 2, No. 1) can be mounted to the front door (FIG. 2, No. 5) by sliding its top and bottom edges through a plastic grip (FIG. 2, No. 25 and FIG. 8, No. 6) mounted on the top surface of the front door (FIG. 2, No. 5).

There is a locking mechanism (FIG. 2, No. 26) which automatically locks when the front door (FIG. 2, No. 5) is shut preventing front door to open when bicycle is in motion. By pushing release bottom (FIG. 3, No. 17) located on the center of top panel equipment strip (FIG. 3, No. 4) the lock is released and access to interior compartments is provided.

Figure 11:
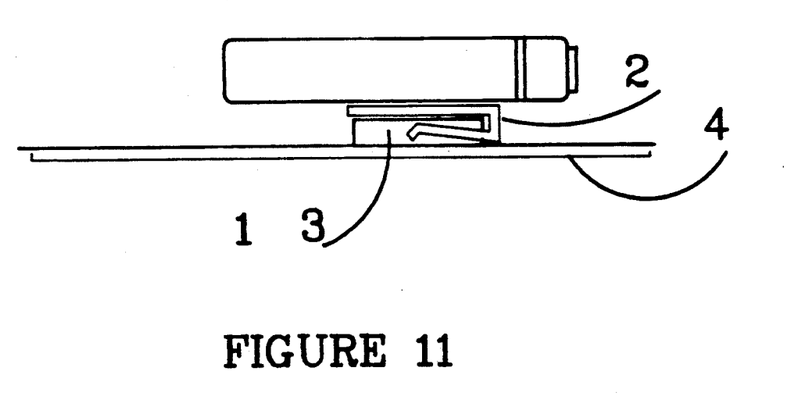
FIG. 11: Section through radio hook up.

The top panel of Bike Pal comprises of two multifunctional access doors (FIG. 3, No. 14 and No. 16) and a rigid strip, (FIG. 3, No. 4) connecting side panels of Bike Pal together while providing space for mounting various small electric equipment. The larger door (FIG. 3, No. 16 and FIG. 2, No. 7) gives access to various camera compartments and provides a special grip (FIG. 11, No. 3) in its exterior surface where various types portable radios, cassette players, compact disk players, or portable televisions can be mounted. Devices such as walk man, disk man or watch man usually have a hook in their back panel to mount them on the belt of its users. A typical hook of any such electronic devices (FIG. 11, No. 2) can be inserted to the grip (FIG. 11, No. 3) mounted on the top surface of top door (FIG. 11, No. 4). The interior side of this door is covered with padding and soft fabric (FIG. 2, No. 9 and No. 19)) similar to that of the side panels of camera compartment as discussed earlier. This door provides access to photography equipment compartment. There is a smaller door (FIG. 3, No. 14) next to the large door (FIG. 3, No. 16) providing access to liquid container located underneath it. This door has a window covered with transparent synthetic material (FIG. 3, No. 11 and FIG. 1, No. 4) designed in a special configuration used for reading maps while riding on the bicycle. The front part of this window shaped as a North arrow (FIG. 3, No. 11) graphically coordinating the North direction of the map to the present location of the rider. There is a location indicator drawn as a circle and a cross sign in the middle of window (FIG. 3, No. 12). In the interior side of this door, there is a plastic layer attached to three sides of the door (FIG. 1, No. 7) forming a water proof pocket between top door's window and the plastic layer. To use the map, the desired portion of map is folded and placed face up in this pocket coordinating the North arrow of the map with north arrow of map window. Bicycle rider can read the map through the window without the need for dismounting from bicycle. This map compartment provides continuous access to desired portion of the map. By adjusting the location of the map inside the pocket, the rider can place the map according to its North direction, destination mark or his present location. Said doors are hinged (FIG. 1, No. 14 and FIG. 3, No. 7) to the continuous rigid strip (FIG. 3, No. 4, and FIG. 1, No. 2) connecting the two side panels together. These doors are angled in such a way to facilitate reading of the map and electronic devices mounted on top of the large door during the bicycle ride. Said doors have an automatic locking mechanism, similar to that of front door. By pushing Release bottoms (FIG. 3, No. 13) the lock (FIG. 1, No. 16) is released and top doors can be opened.

Over the rigid connecting strip (FIG. 3, No. 4) there is a digital clock (FIG. 3, No. 5, pulse or calory counter (FIG. 3, No. 6) and or any other electronic instrument the riders wishes to carry. For this reason the entire unused portion of this strip is covered with an attachment strip such as VELCRO (FIG. 1, No. 15) providing suitable place for attaching various small items and electronic gadgets.

Side panels feature two sets of adjustable straps, a wide adjustable strap (FIG. 5, No. 7 and FIG. 6, No. 7) mounted approximately in the middle of the side panels used for carrying Bike Pal on the shoulder of bicycle rider. Second set of strap used to stabilize the Bike Pal as discussed earlier.

The back and bottom panel join each other through a smooth curve reducing the drag.

What is claimed is;

1. A bicycle pack for releasably mounting to a bicycle handlebar comprising: a pack having a back, a front, a top, a bottom and two side panels and means for releasably attaching said pack to a front handle bar and stem of a bicycle, said panels defining an interior storage area, said interior storage area further comprising a plurality of panels, subdividing said interior storage area into a plurality of smaller compartments, each smaller compartment comprising means defining a separate access opening, said pack being constructed from a semi rigid material whereby articles may be stored within said pack without a noticeable deformation to said pack, wherein said attachment means comprises:

a mount having a circular portion capable of wrapping around a front handlebar stem, said circular portion including means for creating friction between the circular portion and the stem while protecting paint or any material applied over said stem, an arm portion serving to space said carrier pack a distance from said handle bar stem while serving to firmly mount said mount to the bicycle handlebar stem, and a mounting portion serving to adjustably mount said carrier pack to said mount, said mounting portion having a safety reflector mounted on a forward facing side end having means for protecting said surface of said reflector, said forward facing side having said safety reflector mounted thereto further including a mounting lip spread apart and depending from a bottom side and a right and left side of said forward facing side, said carrier pack further including a mounting plate secured to said pack, said mounting plate being capable of sliding engagement with said forward facing said and each of said mounting lips depending therefrom whereby said carrier pack may be detachably mounted to said mounting device.

2. A bicycle carrier pack as in claim 1, wherein one of said plurality of smaller compartments includes means for carrying liquid, said compartment having means for insulating said liquid.

3. A bicycle carrier pack as in claim 1, wherein one of said plurality of smaller compartments includes means for protecting sensitive electronic equipment and photography equipment.

4. A bicycle carrier pack as in claim 1, wherein one of said plurality of smaller compartments includes a means for storing printed materials.

5. A bicycle carrier pack as in claim 1, wherein one of said plurality of smaller compartments includes means for storing miscellaneous items, said compartment further including at least one detachable divider.

6. A bicycle carrier pack as in claim 1, wherein one of said plurality of smaller compartments includes means for storing small tools.

7. A bicycle carrier pack as in claim 1, wherein said front panel has an aerodynamic shape, said front panel further comprising an access door, a demountable, rechargeable front head light and a reflector.

8. A bicycle carrier pack as in claim 1, wherein said panels and said plurality of divider panels are made of a synthetic material.

9. A bicycle carrier pack as in claim 1, wherein said top panel further includes a minimum of two access doors providing access to said smaller compartments located directly below said access doors, and a means for demountably attaching various electronic devices and further comprising means for displaying directional guides without requiring a rider to dismount from the bicycle before reading.

10. A bicycle carrier pack as in claim 1, therein said rear panel includes means for detachably mounting said carrier pack to a front handle bar stem of said bicycle and an adjustable strap mounted to both sides of said pack and said handle bar stem whereby lateral motions of said carrier pack independent of said bicycle may be minimized.

* * * * *